March 31, 1970  J. MARCOVITCH  3,503,237
FABRICATION OF ARTICLES BY ROLLING
Filed Dec. 27, 1966  4 Sheets-Sheet 1
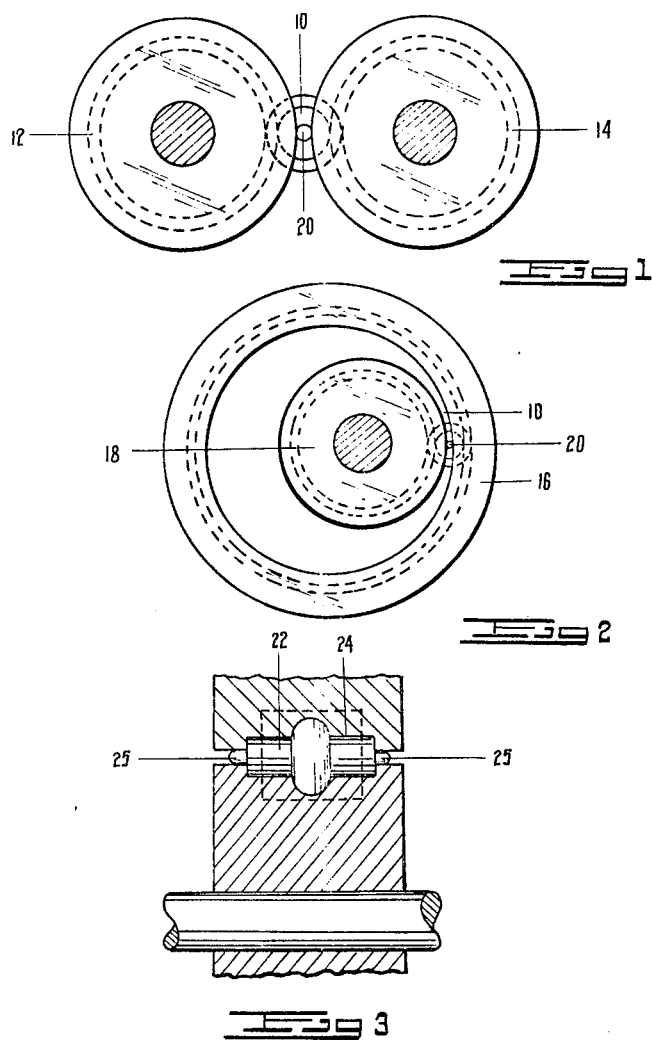
INVENTOR
JACOB MARCOVITCH
BY Young + Thompson
ATTYS.

March 31, 1970     J. MARCOVITCH     3,503,237
FABRICATION OF ARTICLES BY ROLLING
Filed Dec. 27, 1966     4 Sheets-Sheet 2
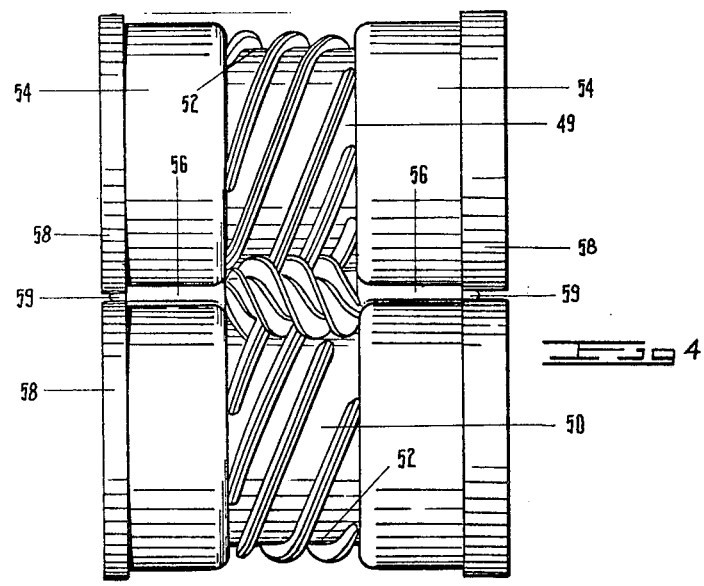
INVENTOR
JACOB MARCOVITCH
BY Young + Thompson
ATTYS.

March 31, 1970 J. MARCOVITCH 3,503,237
FABRICATION OF ARTICLES BY ROLLING
Filed Dec. 27, 1966 4 Sheets-Sheet 3
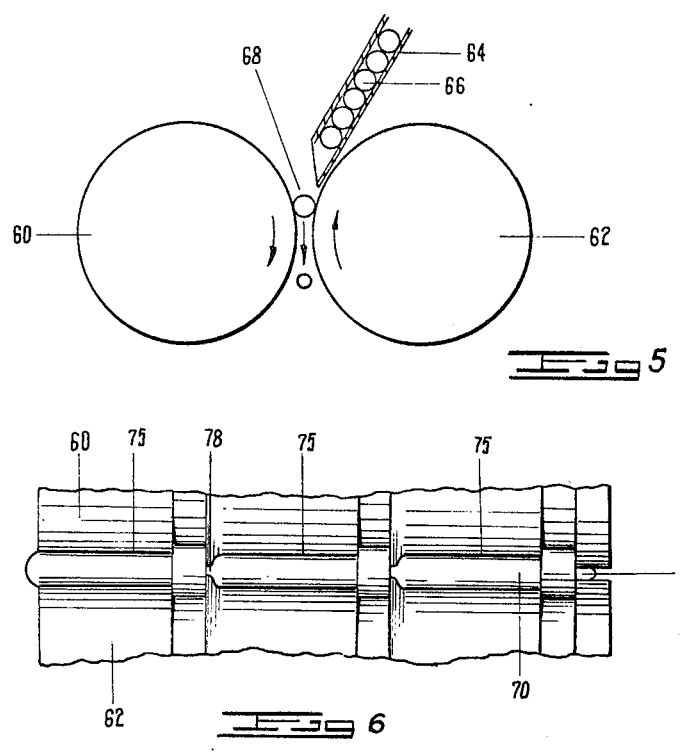
INVENTOR
JACOB MARCOVITCH
BY Young & Thompson
ATTYS.

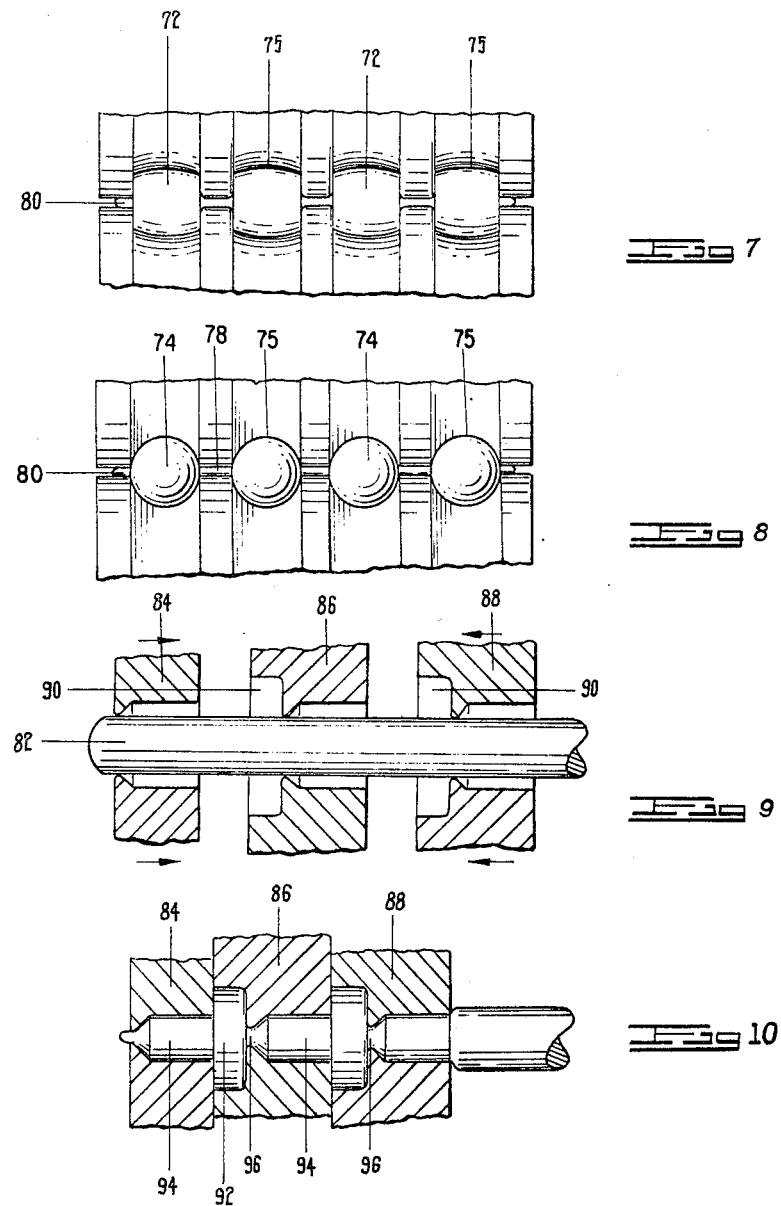

United States Patent Office 3,503,237
Patented Mar. 31, 1970

3,503,237
FABRICATION OF ARTICLES BY ROLLING
Jacob Marcovitch, Johannesburg, Transvaal, Republic of South Africa, assignor to Rotary Profile Anstalt, Vaduz, Liechtenstein
Filed Dec. 27, 1966, Ser. No. 605,062
Claims priority, application Republic of South Africa, Jan. 3, 1966, 66/13; Apr. 25, 1966, 66/2,361
Int. Cl. B21b *1/08;* B21d *15/04*
U.S. Cl. 72—80   1 Claim

ABSTRACT OF THE DISCLOSURE

Solid cylindrical workpieces are profiled by drawing them into and through the convergent throat defined between a pair of juxtaposed rollers, to have imposed on them the profile of the surfaces with which they are in contact during their period of dwell in the throat, while their longitudinal spread is controlled. Preferably the blanks are "hot-rolled." Surplus material is extruded into an escape gap or gaps to form flashes. The rollers may be formed with profiling formations oblique to the axis or with a series of identical circumferential profiling formations abreast, to form a line of articles joined together by severable filaments.

---

This invention relates to the profiling of solid cylindrical articles by rolling, in which a blank is nipped between juxtaposed surfaces defining a convergent throat and is drawn into and through the convergent throat, and, during its passage through the throat, is deformed to receive the profile of the surfaces with which it is in contact. In the vast majority of cases the surfaces are the peripheries of rollers, which may have their outer surfaces juxtaposed, or one roller may be hollow, with the other contained within its cavity. Whatever system is used, the rollers are driven for the surfaces defining the throat to have a differential peripheral speed in the direction of convergence.

It is not excluded, however, that one of the surfaces, or both, is or are planar, or curvilinear and relatively reciprocated to provide the relative movement to draw the workpiece into the throat. A planar surface is, of course, the limiting case of a roller, the radius of which is infinite while a curvilinear surface is a segment of a roller the radius of which approaches infinity. However, for convenience, and since rollers are by far the most likely to provide the surfaces, the specification will hereinafter refer to rollers, but it should be understood that planar or curvilinear surfaces are regarded as equivalent, and included in the ambit of the invention.

The shape of the throat defined between the rollers and the differential speed required to nip the blanks and draw them through the throat will not be discussed, because these conditions are well-known in the art. Hitherto, the extent of deformation imposed on the workpieces has been slight. Indeed, it may be said that the deformation has been superficial, for instance, the rolling of screwthreads into a screw or bolt.

The object of the present invention is to provide a method and apparatus for profiling cylindrical articles in which the deformation extends much beyond the surface zone.

According to the invention, a method of profiling a solid cylindrical blank by rolling, in which the blank is nipped between two juxtaposed rollers as hereinbefore defined, and passed through the convergent throat defined between them with its axis substantially parallel to that of the rollers, and during its passage through the throat is deformed to receive the profile of the rollers is characterized by selecting a blank which is oversize in relation to the article to be produced, deforming the blank so that it contacts surfaces of the rollers which restrict its axial spread, and extruding excess material from at least one end of the blank into an axially extending escape gap provided in those surfaces of the rollers.

Further, according to the invention, apparatus to carry out the method, consists of two juxtaposed profiled rollers as hereinbefore defined, defining between them a convergent throat, means to rotate the rollers so that a solid cylindrical blank may be nipped between them and passed through the throat to receive the profile of the rollers; characterized in that the rollers have surfaces adapted to limit the axial spread of the workpiece during its deformation, those surfaces including at least one axially extending escape gap for surplus material extruded from the blank.

The temperature to which the workpiece is heated will depend upon the material of which it is made. If it is steel, the workpiece is heated sufficiently to allow the steel to flow plastically, while, in the case of materials that are normally plastic such as copper and aluminium, the workpiece, if it is heated at all, is heated to above the temperature at which the workpiece will become work-hardened before the profiling operation has been completed.

In the art as it is at present practised, the problem of spread of the workpiece in the dimensions other than that of the width of the throat, is of no significance because the extent of deformation is so slight that there is a mere rearrangement of material composing the surface zone of the workpiece. Where, however, the deformation is great, as is the case of the technique of the invention, it is a factor of crucial importance. In the passage of the workpiece through the throat, there are at any instant two diametrally opposite forces acting on the workpiece through the lines of contact between the workpiece and the rollers on opposite sides of the throat. These forces have a nutcracker effect, which cause the workpiece to bulge and to assume an elliptical cross-section. As the workpiece rotates, each element is coerced to follow an elliptical course, with the result that the workpiece tends to crack internally, especially at or near its axis. As has been observed above, this is of no significance if only the surface zone of the workpiece is affected.

The rolling of the workpiece in hot condition mitigates the harmful effect of the nutcracker effect in that the plastic flow of the material of the workpiece enables the workpiece to flex without cracking. It facilitates, also, the longitudinal spread of the workpiece resulting from the diminution in diameter.

There is however, another aspect of longitudinal spread which must be mentioned. When the workpiece is rolled, the length in the axial direction increases, but this increase is not constant through the thickness of the workpiece. The surface layers are projected longitudinally at a greater rate than the internal layers and this produces tensile stresses in the workpiece which tend to form a hole at the axis of the workpiece. How far this process proceeds, and whether indeed an axial hole is formed, or whether the central zone is merely disturbed and cracked, will depend upon such factors as the malleability of the material, the ratio of length to diameter, the rate of feed, and the amount of reduction in diameter.

Where, however, the longitudinal spread of the workpiece due to the rolling is controlled, the undesirable phenomenon described above is minimised or even avoided. The flow of the superficial layers and those adjacent to them being arrested, the plastic flow is extended to the inner zones, down to the axis, and the profiled component is, therefore, far more homogeneous than if no axial restraint had been applied to it. It is desirable that the blank that is worked on should have much the same length as the finished length of the finished component, so that plastic flow is largely radial.

Various embodiments of the invention are illustrated in the accompanying drawings, in which:

FIGURE 1 is a side view of an embodiment,
FIGURE 2 is a side view of a second embodiment,
FIGURE 3 is a partial section showing the throat of either embodiment,
FIGURE 4 is a vertical section showing a worm wheel being rolled,
FIGURE 5 is a schematic view of apparatus to profile lines of articles,
FIGURES 6 to 8 show the kind of articles which can be made,
FIGURE 9 is a fragmentary view of separable rollers, and
FIGURE 10 is another fragmentary view of the rollers of FIGURE 9.

In FIGURES 1 and 2, the throat 10 is defined between juxtaposed rollers which, in the first figure, are external so that the throat is defined by the outer surfaces of the rollers 12, 14, and in the second figure are contained one within the other, so that the throat is defined by the inner surface of the outer roller 16 and the outer surface of the inner roller 18. The practical difference between the two constructions is that the throat, in the second case, can be made more gradually convergent, so that the period of dwell in the throat of the workpiece can be longer.

The usual purpose of the machine of the invention is to profile steel, and, for steel, the workpiece 20 is heated to a temperature of normal for hot-forging of steel, before it is offered to the throat. For more malleable materials such as copper and aluminum, the temperatures will be near their hot-forging temperatures.

The amount of deformation which can be imposed on a workpiece by the technique of the invention is indicated in FIGURE 3, where the throat 10 is seen at its narrowest point. A workpiece, orginally a cylindrical blank, shown in dotted line, has been profiled as it passes along the throat, to the shape shown at 22, where it fills the recess 24 defined by registering grooves in the two rollers. It will be observed that the stubby blank has been reduced very substantially in diameter, and that, to each side of the recess, material in the blank surplus to that which can be accommodated in the recess 24, has been extruded into the narrow gaps to each side of the recess, between the rollers, to form flashes 25.

It has not, to applicant's knowledge, ever been believed possible to impose so great a deformation on a steel blank in one operation. Since metal is substantially incompressible, the diminution imposed on the blank when it is caused to flow plastically causes spread in the axial direction. There may be cases in which only the circumferential shape of the profiled workpiece is of importance, and in which the exact destination of the flowing metal does not matter. In the vast majority of cases, however, it is of importance to produce a finished product accurate as to all dimensions. For this reason, the invention provides that the axial spread of the workpiece be controlled by entrapping the workpiece in what is, in cross-section, a substantially enclosed profiling space, which, as the throat decreases in width, becomes filled with the workpiece and prescribes its final shape. As it is not practicable to provide blanks which are so precise as to volume as exactly to fill the profiling space, the invention provides that blanks be used that are made somewhat oversize, to ensure complete filling of the profiling space, the surplus material being extruded in the axial direction from the profiling space as a flash, which is later removed by a simple operation such as cutting or grinding.

It is believed that the concept of entrapping the workpiece completely, so that the pressure put upon it by the narrowing throat forces it to fill the space within which it is entrapped, is a new departure in the art, and that it enables articles to be produced to a high degree of accuracy and with a sufficiently good finish to require very little subsequent treatment. Even where a subsequent heat treatment is needed which prduces some distortion in the article, the grinding operation is much less severe than is the case with articles produced by other techniques.

In FIGURES 1 to 3, attention has been given only to the production of articles which, at all cross-sections, are round. However, the technique of the invention is by no means confined to such profiles, and it may be very advantageously employed for the porduction of products which have profiles the circularity of which at some or all sections normal to the long axis, is interrupted. Such an article is, for instance, a coarsely screw-threaded or helically toothed article.

In FIGURE 4, the apparatus to form a worm gear is illustrated. The rollers 49, 50 have lands 54 flanking recesses 52 that are spaced apart, when the throat is at its narrowest, to profile a pair of stub axles 56. Beyond the lands 54, the rollers have heads 58 that ar spaced apart only sufficiently to accommodate pips 59.

The apparatus of FIGURE 4 permits the gear to be made solely by profiling (save for the removal of pips) with virtually no loss of material. There is thus a great saving in cost and in time, compared with the conventional manner of forming the gear by machining, while the properties of the gear material are greatly enhanced.

It is not necessary that a single article be made at a time. Indeed, the technique of the invention is best carried out by rolling a line of articles end to end. This procedure is illustrated in FIGURES 5 to 9.

In FIGURE 5, two rollers 60, 62 are shown as juxtaposed and rotated in opposite directions. A chute 64 delivers a stream of blanks 66 to the throat 68 one after the other. The rollers are rotated at different peripheral speeds, and the differential speed and the diameters of the rollers are so chosen that the blanks are nipped between the rollers and drawn through the throat, from which they are gravitationally discharged. The calculation of the ideal angle of nip and of the optimum differential speed is so well known in the art as to require no elaboration.

FIGURES 6 to 8 show how the rollers 60, 62 may look in side view. The rollers are profiled in register to form working spaces that collectively define the shape of the article to be produced. This article is, in FIGURE 6, a headed stud 70 that can serve as a blank for a screw or bolt; in FIGURE 7 a roller 72 for a roller bearing; and in FIGURE 8, a ball 74 for a roller bearing. The pair of rollers are formed with a line of identical recesses 75, as can be seen in FIGURES 6, 7 and 8.

The rollers are spaced slightly apart to provide, at the narrowest part of the throat 68, gaps 76. These gaps occur, not only between the recesses 75, but at each end of the rollers.

The blanks 66 are lengths of metal rod. Suitable guide means is provided to ensure that they gravitate into correct register with the rollers, as they are nipped by them and drawn into the throat 68. As they progress through the throat, they are squeezed into the registering recesses 75 to form a chain of articles, such as 70, 72, 74, separated by thin filaments or webs 78 that are easily rupturable.

It will be appreciated that this operation can be considered as a kind of parting operation, since all of the cross-section of the blank disappears except for the slender filament.

The volume of the blanks used is calculated to produce the set of articles without significant excess material and without voids. Slight excess material is catered for by providing for endwise extrusion of a flash 80 at the ends of the chain. Since the metal must flow freely into the recesses 75 of the rollers, to ensure complete filling, the technique of the invention is best carried out with hot blanks to promote plastic flow.

In a development of the invention shown in FIGURE 9, the blank is a rod 82 which is profiled by a series of rollers 84, 86, 88 that are virtually spaced apart and are forced axially together by any suitable pressure-applying device (not shown), as indicated by the arrows, so that metal flows into the cavities 90 between adjacent rollers, to form heads 92. The rolling preferably takes place in two stages, one a stage in which the rollers move radially inwardly to form the stems 94 of the elements, and the second in which they are moved axially to form the heads 92. The cavities are shaped for the formation of the webs 96. The process may be carried out on a long rod, moved axially as a section is profiled, to bring another section into place.

I claim:

1. A method of avoiding internal cracks while profiling a solid cylindrical bar, comprising nipping between two rollers a solid cylindrical bar whose axis is parallel to the axes of the rollers and which is oversize in relation to the article to be produced, passing the bar through the convergent throat defined between the two rollers while rotating the rollers in the same direction so that adjacent peripheral portions of the rollers move in opposite tangential directions, extruding excess material from at least one end of the bar into an axially extending escape gap defined between the opposed surfaces of the rollers thereby to form a flash on the axis of the bar at said at least one end of the bar, and maintaining the axes of the rollers a constant distance apart throughout the profiling of the bar.

References Cited

UNITED STATES PATENTS

| | | | |
|---|---|---|---|
| 2,061,034 | 11/1936 | Lennon | 72—105 X |
| 417,733 | 12/1889 | Lumley | 72—108 |
| 672,516 | 4/1901 | Schinneller | 72—108 |
| 1,366,717 | 1/1921 | Clark | 72—92 |
| 1,367,299 | 2/1921 | Canda | 72—94 X |
| 1,370,978 | 3/1921 | Long | 72—108 X |
| 1,496,083 | 6/1924 | Browne | 72—104 |
| 2,342,917 | 2/1944 | Brown | 72—108 X |
| 2,495,533 | 1/1950 | Macklin et al. | 72—94 |
| 3,277,684 | 10/1966 | Gareri | 72—105 |
| 3,382,693 | 5/1968 | Rozhdestvensky et al. | 72—87 |

MILTON S. MEHR, Primary Examiner

U.S. Cl. X.R.

72—91, 94, 108, 109